(No Model.)
J. M. RAUHOFF.
CLUTCH.
No. 575,988. Patented Jan. 26, 1897.
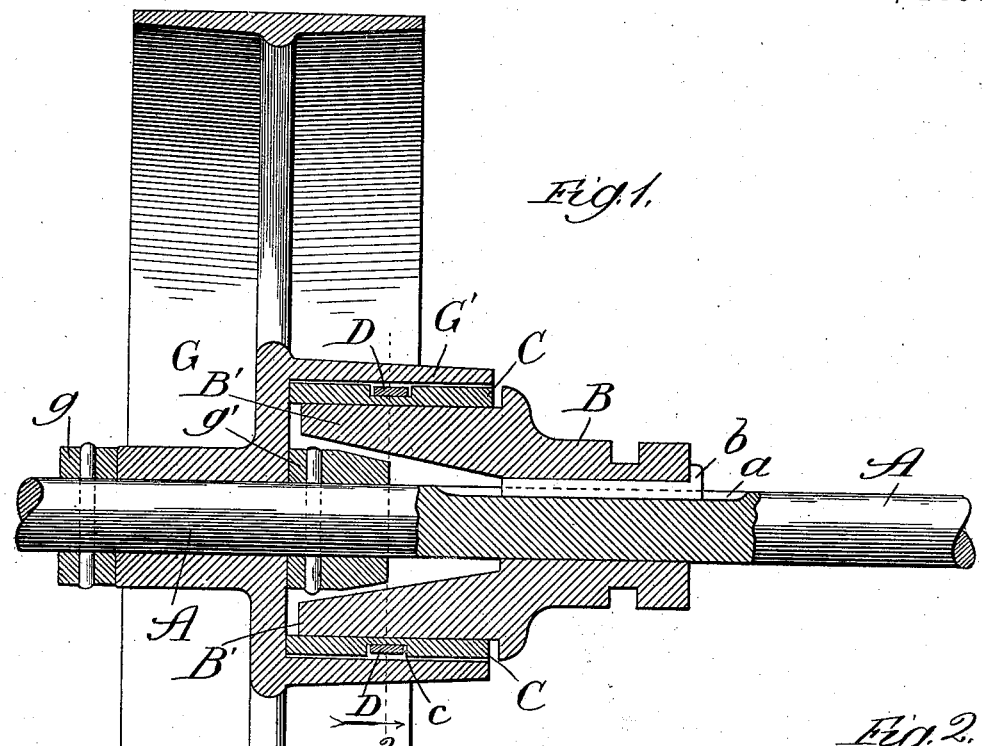
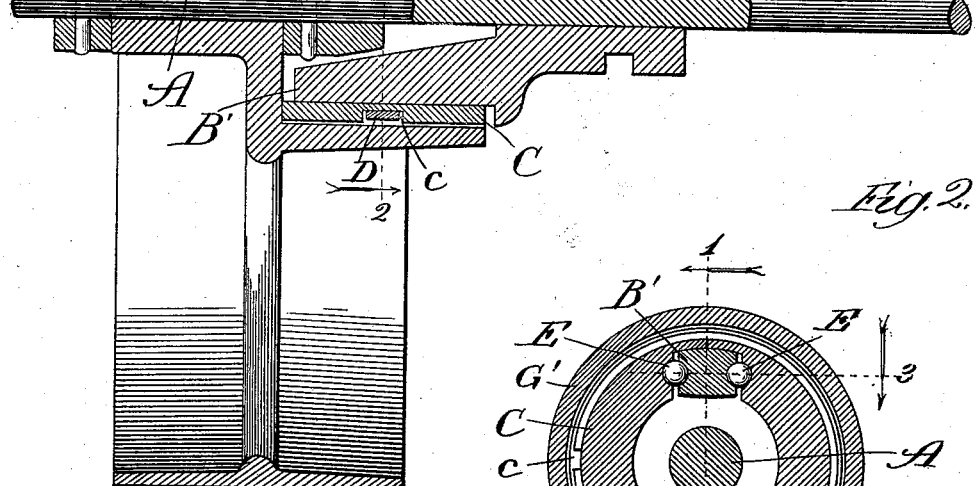
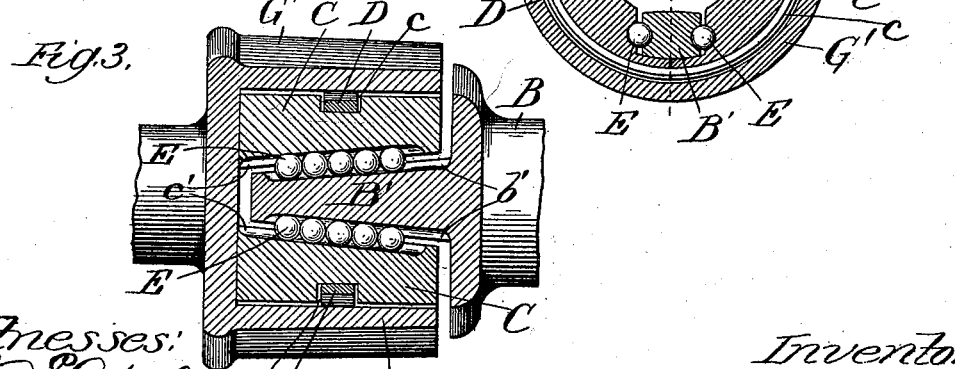
Witnesses:
Inventor:
John M. Rauhoff,
By Banning & Banning & Sheridan,
Att'ys

UNITED STATES PATENT OFFICE.

JOHN M. RAUHOFF, OF CHICAGO, ILLINOIS, ASSIGNOR OF ONE-HALF TO JAMES SAUNDERS, OF MARIETTA, GEORGIA.

CLUTCH.

SPECIFICATION forming part of Letters Patent No. 575,988, dated January 26, 1897.

Application filed January 10, 1896. Serial No. 574,943. (No model.)

*To all whom it may concern:*

Be it known that I, JOHN M. RAUHOFF, a citizen of the United States, residing at Chicago, Cook county, Illinois, have invented certain new and useful Improvements in Clutches, of which the following is a specification.

My invention relates particularly to friction-clutches for use in connection with the transmission of power from a movable shaft to a pulley or other mechanism, or vice versa, and especially to mechanism for reducing the friction or adhesion between the clutch and the shaft upon which it is mounted.

The object of my invention is to provide a simple, economical, and efficient friction-clutch; and the invention consists in the features and combinations hereinafter described and claimed.

In the accompanying drawings, Figure 1 is a vertical elevation, partly in section, showing my improvement as applied to a shaft and loose pulley; Fig. 2, an enlarged transverse section taken on the line 2 of Fig. 1; and Fig. 3, a longitudinal section of a portion of the mechanism, taken on line 2 of Fig. 2, looking in the direction of the arrow.

In constructing my improvement and applying it to a shaft and pulley I provide a shaft A, which in this particular instance may be used as the driver, and upon it I mount a sleeve B, which in turn is provided with a key $b$, entering a groove $a$ in the shaft, the arrangement being such that the sleeve has imparted to it the rotary movement of the shaft, but is free to move independent laterally. This sleeve I prefer to provide with two wedge-shaped expanding fingers or prongs B′, upon which is mounted a split collar C in such a manner that the collar may be expanded or contracted by the movements of the sleeve. In order to hold this split collar normally in contact with the prongs of the sleeve and as occupying the smallest space or diameter, I provide it with an annular groove $c$, in which is located a circular metallic spring D, the arrangement being such that when the sleeve is at or near its outermost limit of motion the split collar rests upon the prongs, as shown in Fig. 2, and occupies its smallest diameter. During the movements of the sleeve and the wedging action consequent upon such movements it would be very difficult to return the split collar to its smallest diameter after being once expanded, and in order to facilitate this contraction I provide the split collar with a groove $c'$ and the prongs of the sleeve with grooves $b'$, in which are placed a series of antifriction-balls E, which occupy what might be termed an "inclined" plane. It will thus be seen that when the sleeve is retracted or withdrawn to its outermost limit of motion the spring will act to move the split collar, so that it will roll outwardly upon its antifriction-balls and be contracted in diameter.

For the purpose of demonstrating the practicability of my improvement in one of my drawings I have shown a pulley G as being loosely mounted upon the driving-shaft, but held against longitudinal movement by means of the collars $g$ $g'$, which are fixed rigidly to the shaft. This pulley is provided with a center projecting hub having an axial opening adapted to easily receive the split collar, so that when such collar is in the position shown in Fig. 1, but with the parts moved to their innermost position, the collar may be expanded so as to firmly grip the interior surface of the hub and thus transmit the motion and power of the driving-shaft to the pulley, and vice versa.

While I have described my invention with more or less minuteness as regards details and as being embodied in more or less precise forms and as applied to certain specific mechanical structures, I do not desire to be limited thereto unduly no more than is pointed out in the claims. On the contrary, I contemplate all proper uses, changes of form, construction, and arrangement, the omission of material parts, and the substitution of equivalents, as circumstances may suggest or necessity render expedient.

I claim—

1. In a clutch, the combination of a movable shaft, a sleeve mounted upon such shaft, a split collar mounted upon such sleeve, a spring for normally holding the split collar in its smallest diameter, and a series of balls interposed between the split collar and the sleeve to lessen the friction and adhesion of the parts, substantially as described.

2. In a clutch, the combination of a shaft, a sleeve longitudinally movable upon such shaft, and provided with at least two taper projecting prongs, a split collar mounted upon such prongs and provided with a spring to normally hold a collar at its smallest diameter, a series of balls interposed between the split collar and the taper projecting prongs to facilitate the operation of the parts, and adjacent mechanism provided with a circular recess adapted to receive the split collar and be engaged thereby when such collar is expanded, substantially as described.

JOHN M. RAUHOFF.

Witnesses:
 THOMAS F. SHERIDAN,
 THOMAS B. MCGREGOR.